Aug. 13, 1929.  F. ALLISON  1,724,866
ENLARGING EXTENSION FOR CAMERAS
Filed May 12, 1927
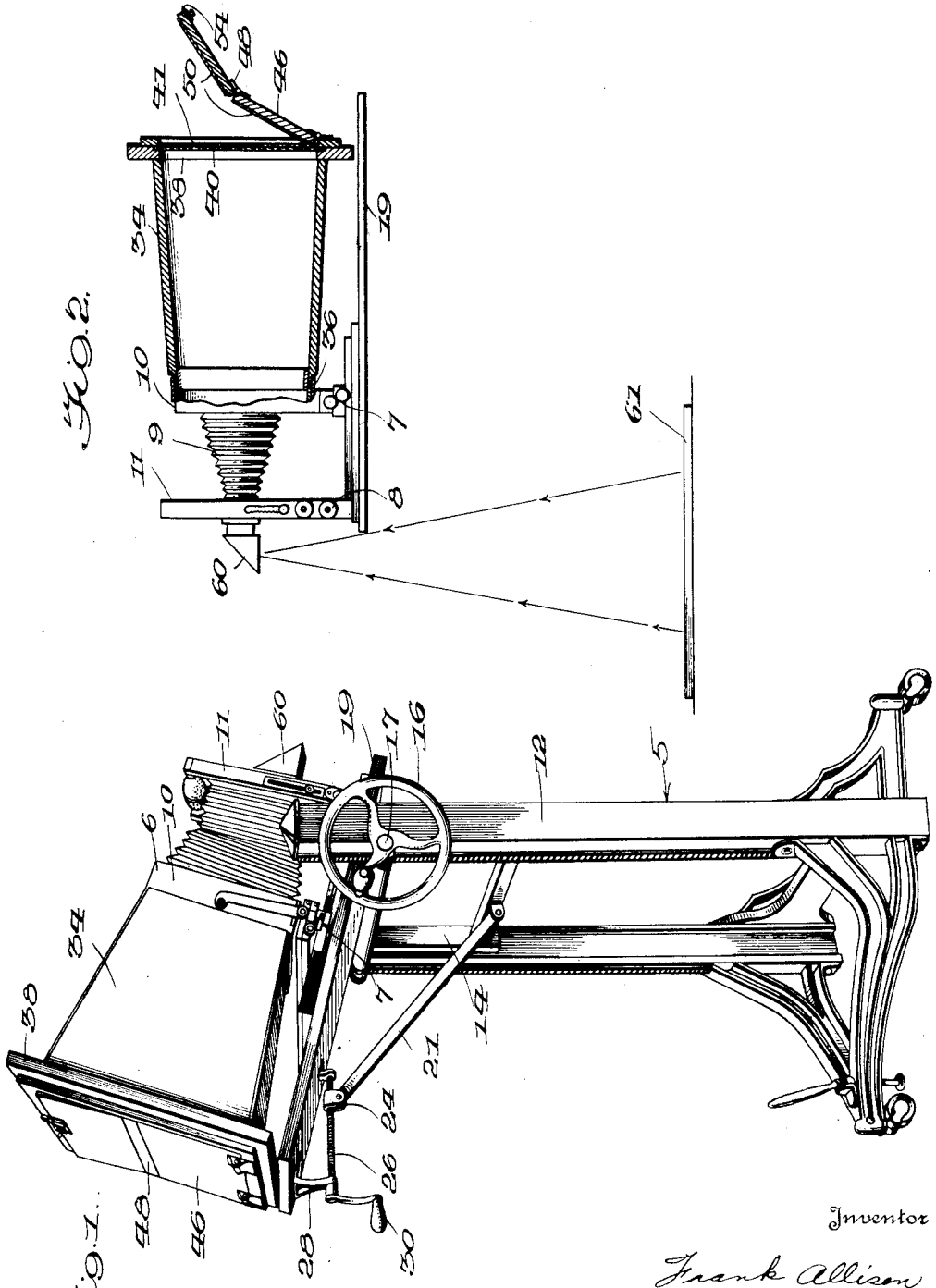

Patented Aug. 13, 1929.

1,724,866

UNITED STATES PATENT OFFICE.

FRANK ALLISON, OF OKMULGEE, OKLAHOMA.

ENLARGING EXTENSION FOR CAMERAS.

Application filed May 12, 1927. Serial No. 190,736.

This invention relates to cameras and more particularly to a means to aid in the production of copies of commercial and other matter to scale.

The invention forming the subject of this application aims to provide accurate means by which photographic copies may be produced without the intervention of films or plates if so desired whereby the time and financial expenditure necessary for the work is greatly reduced.

A further and equally important object of the invention is to provide a camera attachment which may be applied to a standard commercial camera without detracting from the availability of the camera for other purposes.

In the accompanying drawing forming a part of this application and in which like numerals are employed to designate like parts throughout the same, Figure 1 is a perspective of a camera embodying the invention.

Figure 2 is a longitudinal sectional view through the invention.

In the drawing wherein for the purpose of illustration is shown a preferred embodiment of the invention the numeral 5 designates a mobile camera stand upon which a commercial camera 6 is adjustably mounted as indicated at 7 and 8. A bellows 9 of conventional design is positioned between the end members 10 and 11 as is usual.

Figure 1 illustrates that the mobile stand 5 is provided with a pair of grooved standards 12 to which a frame 14 is slidably connected. The hand wheel 16 on one end of a geared shaft 17 carried by the frame provides a means whereby the platform 19 may be raised or lowered as will be obvious.

Figure 1 also illustrates that a link or bracket 21 is pivoted to the frame 14 and to a feed nut 24 on a shaft 26 carried by the underside of the platform. More specifically the shaft 26 is rotatably carried by brackets 28 secured to the platform. One end of the shaft 26 is provided with a crank 30 adapted to be manually turned to tilt the platform when it is desired to adjust the camera mounted thereon, preparatory to taking one or more photographs.

The matter thus far described is not uncommon to standard commercial cameras and the invention forming the subject matter of this application comprises a chambered body 34 having the form of a truncated pyramid, one end of which is slightly reduced and is secured to the end member 10 by clips 36 or other easily operated fastening devices. The rear end of the chambered body is provided with a frame 38 in which a plain glass 40 is positioned. Figure 1 illustrates that a ground glass 41 is adapted to be detachably positioned against the rear surface of the clear glass 40 and provides a means for checking the adjustment of the camera preparatory to the operation thereof. More specifically the ground glass is placed against the clear glass 40 and is brought into use when it is desired to check the spacing, alignment, focus and size of image on the focal plane.

Before proceeding with a description of the operation it is pointed out that subsequent to the focusing of the camera for use in connection with a particular object, such as a map to be reproduced on an enlarged or reduced scale, the ground glass is removed and sensitized paper, a plate or a film substituted, after which a hinged back 46 is moved to closed position. The back 46 consists of a pair of sections connected by a light proof hinge 48 by which light is effectively excluded. Furthermore, the inner sides of the two sections of the back are covered with felt 50 by which the sensitized paper, the plate or the film, as the case may be, is pressed flatly against the glass 40. Figure 2 illustrates that the felt 50 of the lower section extends between the lower edge of the lower section and the adjacent portion of the chambered body 34 to effectively avoid the passage of light at this point. The upper section of the double hinged back may be provided with a spring actuated latch 54 by which the back may be held in closed position.

A prism 60 is employed when the object to be photographed is positioned on a horizontal or a substantially horizontal work table as suggested in Figure 2.

In operation the matter to be reproduced on the same, a reduced or an enlarged scale is placed upon the table 61 and the camera is raised or lowered by adjusting the platform 19 to regulate the distance between the lens and the copy board. It is believed to be obvious that this adjustment is made in accordance with the scale required.

It will be seen that the tilting adjustment allows the operator to secure perfect alignment of the projected image on the focal plane. The bellows provides for adjusting the distance from the lens to the focal plane to secure proper focus of the projected image onto the focal plane. As previously suggested, the ground glass 41 is used to check the spacing, alignment, size of image, etc., as the image is projected onto this ground glass preparatory to making the necessary copy or copies. When adjustment has been made and the parts of the camera secured in position the ground glass is removed.

In practice the camera may be placed in a dark room equipped with a safe light. After the focus, size and alignment have been checked the operator switches off all white light which may have been present and places the plate, film or sensitized paper in the back against the clear glass and closes the light proof hinge back 46. The white lights are then switched on for sufficient time for correct exposure, after which the film or paper or plate is removed and developed in the usual manner. This is repeated until the required number of copies are made.

The use of continuous light on the copy board may be had by allowing the front of the camera to extend through a partition into an adjoining room illuminated by natural or artificial light, the exposure in this case being made by operating the lens shutter.

A camera attachment constructed in accordance with this invention may be easily attached to cameras of conventional design and photographic copies made in accordance with the procedure herein outlined without the employment of other special mechanism or parts. In fact no special paper, film or plate holders are necessary as the hinge back 46 performs this function.

It is important to note that absolutely true scale is maintained in making all reproductions since the image is projected onto the removable ground glass and is focused in the same manner as are all focusing model cameras.

An infinite number of adjustments or variations in scale are possible and as suggested copies may be made without the intervention of plates or films.

Having thus described the invention, what is claimed is:

1. An enlarging extension for cameras comprising a tubular body which is open at one end, means at that end for affixing the body to a camera end member, a frame carried by the other end of the body having an opening full-size of the interior of the body to permit the making of pictures up to the maximum size of the body opening, and a pane fixed in the frame to serve as a permanent base for the purposes described.

2. An enlarging extension for commercial cameras comprising a chambered body having one end provided with a transparent glass, a sectional back hinged to said chambered body adjacent said glass and being provided with light proof hinges, and a layer of felt secured to the inner side of said sectional back, a portion of said felt being extended between one edge of said back and the adjacent portion of said chambered body.

In testimony whereof I affix my signature.

FRANK ALLISON.